US006273210B1

(12) United States Patent
Saito et al.

(10) Patent No.: US 6,273,210 B1
(45) Date of Patent: Aug. 14, 2001

(54) CENTER TAKE-OFF TYPE POWER STEERING APPARATUS

(75) Inventors: Tatsuya Saito; Satoshi Hamano, both of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/522,749

(22) Filed: Mar. 10, 2000

(30) Foreign Application Priority Data

Mar. 12, 1999 (JP) .................................................. 11-067500

(51) Int. Cl.$^7$ ....................................................... B62D 5/04
(52) U.S. Cl. ...................... 180/444; 180/400; 280/93.515
(58) Field of Search .................................. 180/428, 427, 180/444, 400, 434, 255; 280/93, 93.51, 93.514, 93.515; 74/422, 498; 277/636

(56) References Cited

U.S. PATENT DOCUMENTS

| | | | | |
|---|---|---|---|---|
| 3,661,032 | * | 5/1972 | Jenvey | 74/498 |
| 3,709,099 | * | 1/1973 | Dumeah | 91/54 |
| 4,352,304 | * | 10/1982 | Warner | 74/498 |
| 4,373,599 | | 2/1983 | Walter et al. | . |
| 4,405,012 | * | 9/1983 | Mach | 165/78 |
| 4,428,450 | * | 1/1984 | Stentstrom et al. | 74/422 |
| 4,479,400 | * | 10/1984 | Rieger | 74/422 |
| 4,653,602 | * | 3/1987 | Anders et al. | 180/428 |
| 4,676,335 | | 6/1987 | Adams | . |
| 4,683,971 | * | 8/1987 | Westercamp et al. | 180/444 |
| 4,811,813 | * | 3/1989 | Hovanchak | 180/428 |
| 5,181,581 | * | 1/1993 | Engler | 180/428 |
| 5,419,741 | * | 5/1995 | Schwarzler | 464/175 |
| 6,039,334 | * | 3/2000 | Ozeki | 280/93.514 |

FOREIGN PATENT DOCUMENTS

| | | | | |
|---|---|---|---|---|
| 1463358-A1 | * | 2/1977 | (GB) | 280/93.514 |
| 57-174275 | | 11/1982 | (JP) | . |
| 6216389 | | 4/1987 | (JP) | . |
| 10-315995 | | 12/1998 | (JP) | . |

\* cited by examiner

Primary Examiner—Paul N. Dickson
Assistant Examiner—Daniel Yeagley
(74) Attorney, Agent, or Firm—Orum & Roth

(57) ABSTRACT

A center take-off type power steering apparatus having a gear housing and a power cylinder positioned regarding a rotation direction of the power cylinder about a common center axis of the both by a pin forcibly fitted into one of the gear housing and the power cylinder, the gear housing and the power cylinder being fixed regarding the axial direction of the power cylinder by causing a stopper ring provided at one of the gear housing and the power cylinder and a lock nut screwed to the other thereof to abut on each other.

3 Claims, 6 Drawing Sheets

CENTER TAKE-OFF TYPE POWER STEERING APPARATUS

BACKGROUND OF THE INVENTION

1. Field of the Invention

The present invention relates to a center take-off type power steering apparatus such as a hydraulic power steering apparatus, an electromotive power steering apparatus, and the like.

2. Description of the Related Art

Conventionally, in power steering apparats, a rack shaft is supported by a gear housing to be linearly movable, a power cylinder is coupled to the gear housing, the rack shaft is caused to pass through the power cylinder and propelling force generated by the power cylinder is imparted on the rack shaft, so that steering force can be assisted. In a center take-off type power steering apparatus of the power steering apparatuses which has been disclosed in Japanese Utility Model Application Laid-Open (JU-A) No. 57174275, a coupling member for coupling left and right tie-rods to an intermediate portion of the rack shaft is provided so as to be movable in a reciprocating manner within a window-shaped portion formed in a side wall of the power cylinder.

In the conventional art, however, there are the following drawbacks. (1) In the center takeoff type power steering apparatus, when positions of a gear housing and a power cylinder relative to each other regarding rotation direction about a common central axis thereof are even slightly deviated from each other at a connecting portion between the gear housing and the power cylinder, a coupling member between tie-rods and a rack shaft can not be moved smoothly due to the coupling member striking a window-shaped portion in an offset manner and the like so that the coupling member may be damaged. (2) A bellows-shape boot covering the window-shaped portion of the power cylinder comprises a singly body, one end of the boot being fastened to a mounting boss provided at the gear housing and the other end thereof being fastened to a mounting boss provided at the power cylinder. Bolts or the like for fixing tie-rod mounting members to the above-mentioned coupling member penetrate an intermediate portion of the boot. For this reason, holes of the boot which the above bolts or the like penetrate expand due to repetition of movement of the coupling member following leftward and rightward movements of the rack shaft, so that the boot is fatigued. As a result, the water-proof sealing property of the boot is damaged so that water or other foreign material may enter into the boot. (3) In the center take-off type power steering apparatus, the tie-rods are arranged in the vicinity of the boot, while the boot comprises an elastic body such as rubber. In order to prevent an intermediate portion of the boot positioned between both end portions thereof from deforming or hanging, it is desired to make the outer diameter of the boot large and make the inner diameter thereof small. In this case, however, the likely drawback is that the outer surface of the boot and the tie-rods interfere with each other, and the inner face of the boot and the rack shaft come in contact with each other.

SUMMARY OF THE INVENTION

An object of the present invention is to secure relative positioning between a gear housing and a power cylinder to allow a coupling portion between tie-rods and a rack shaft to move smoothly within a window-shaped portion of the power cylinder in a center take-off type power steering apparatus.

Also, another object of the invention is to improve durability of a boot in a center take-off type power steering apparatus.

Furthermore, still another object of the invention is to prevent a boot and tie-rods from interfering with each other, or the boot and a rack shaft from contacting each other, in a center take-off type power steering apparatus.

According to the present invention, there is provided a center take-off type power steering apparatus where a rack shaft is supported by a gear housing so as to be linearly movable, a power cylinder is coupled to the gear housing, and the rack shaft penetrates the power cylinder, so that propelling force generated by the power cylinder can be imparted on the rack shaft to assist steering force. A coupling member for coupling left and right tie-rods to an intermediate portion of the rack shaft is provided so as to be movable in a reciprocating manner within a window-shaped portion formed at a side wall of the power cylinder. The gear housing and the power cylinder are positioned regarding rotation direction of the power cylinder about a common center axis of the both by a pin forcibly fitted into one of the gear housing and the power cylinder. The gear housing and the power cylinder are fixed regarding the axial direction of the power cylinder by causing a stopper ring provided at one of the gear housing and the power cylinder and a lock nut screwed to the other to abut on each other.

According to the present invention, there is provided a center take-off type power steering apparatus where a rack shaft is supported by a gear housing so as to be linearly movable, a power cylinder is coupled to the gear housing, and the rack shaft penetrates the power cylinder, so that propelling force generated by the power cylinder can be imparted on the rack shaft to assist steering force. A coupling member for coupling left and right tie-rods to an intermediate portion of the rack shaft is provided so as to be movable in a reciprocating manner within a window-shaped portion formed at a side wall of the power cylinder. A boot holder fixed to the coupling member for the left and right tie-rods is disposed so as to surround the power cylinder. Each of the left and right boots for covering the window-shaped portion of the power cylinder at left and right sides of the boot holder respectively extends between one of first mounting portions of the gear housing and the power cylinder, and a corresponding one of second mounting portions of the boot holder.

Furthermore, according to the present invention, there is provided a bellows-shaped boot used for a power steering apparatus where a rack shaft is supported by a gear housing so as to be linearly movable, a power cylinder is coupled to the gear housing, and the rack shaft penetrates the power cylinder, so that propelling force generated by the power cylinder can be imparted on the rack shaft to assist steering force. Where a boot extends between a first mounting portion and a second mounting portion, an outer shape of the boot is made straight from the first mounting portion towards the second mounting portion, and an inner shape thereof comprises a tapered portion with a diameter reduced gradually from the first mounting portion and a straight portion, with almost the same diameter as the minimum inner diameter of the tapered portion extending straight to the second mounting portion.

BRIEF DESCRIPTION OF THE DRAWINGS

The present invention will be more fully understood from the detailed description given below and from the accompanying drawings which should not be taken to be a limi

DESCRIPTION OF THE PREFERRED EMBODIMENTS

Figure 1:
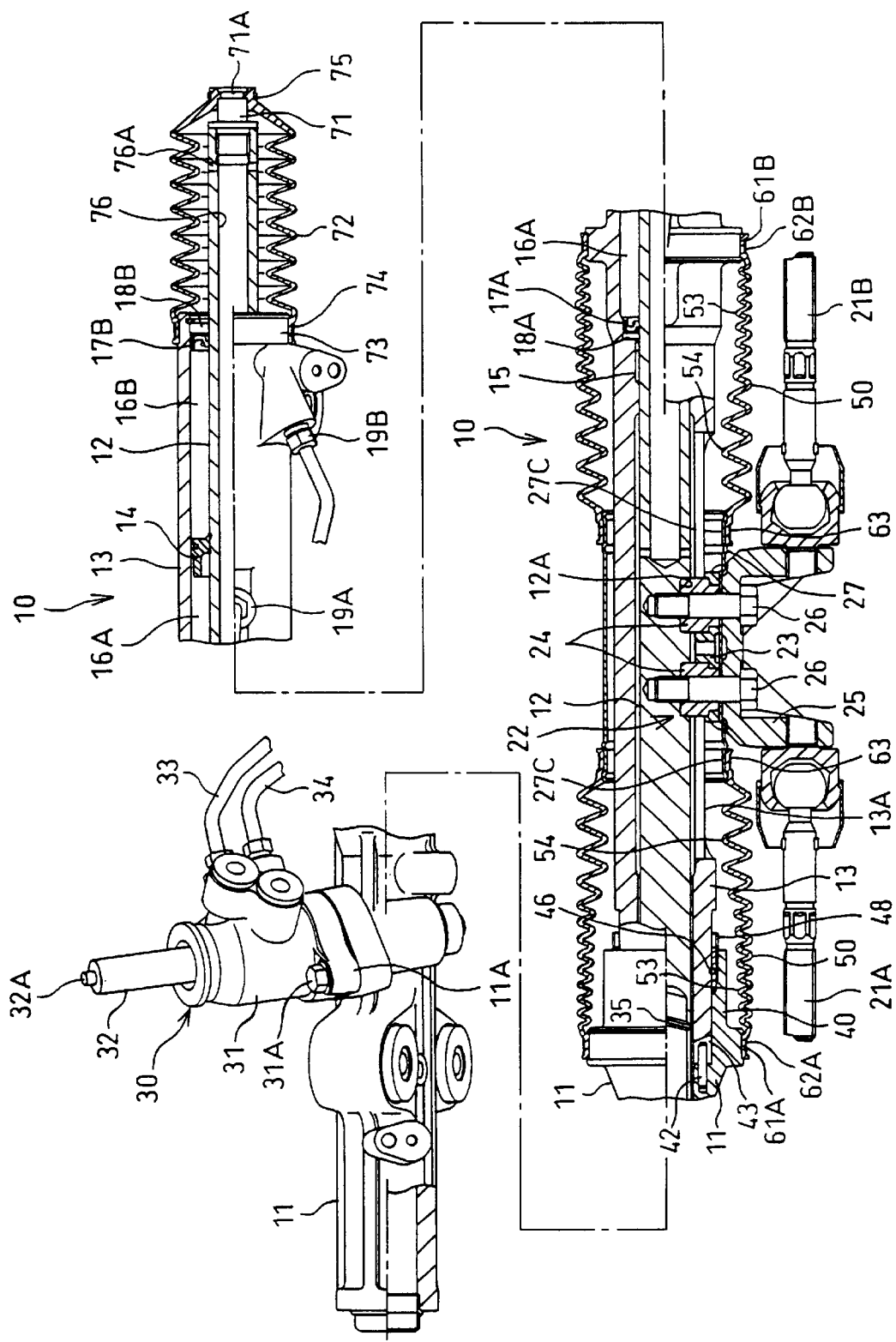
- FIG. 1 is a partial perspective view showing a hydraulic power steering apparatus.

In a center take-off type power steering apparatus 10, as shown in FIG. 1, a rack shaft 12 is supported to a gear housing 11 fixed to a vehicle body frame or the like via a bearing (not shown) by a bracket (not shown) to be linearly movable and the gear housing 11 is coupled with a power cylinder 13. The rack shaft 12 is inserted into the power cylinder 13, and the rack shaft 12, penetrating the power cylinder 13, is provided with a piston 14. Reference numeral 15 denotes a bearing provided at the power cylinder 13 for the rack shaft 12: reference numerals 16A and 16B denote a first chamber and a second chamber of the power cylinder 13: reference numerals 17A and 17B denote oil seals: reference numerals 18A and 18B respectively denote seal retainers: and reference numerals 19A and 19B denote ports. With this structure, the hydraulic power steering apparatus 10 imparts propelling force generated by the power cylinder 13 onto the rack shaft 12, thereby assisting the steering force of a driver.

Figure 6:
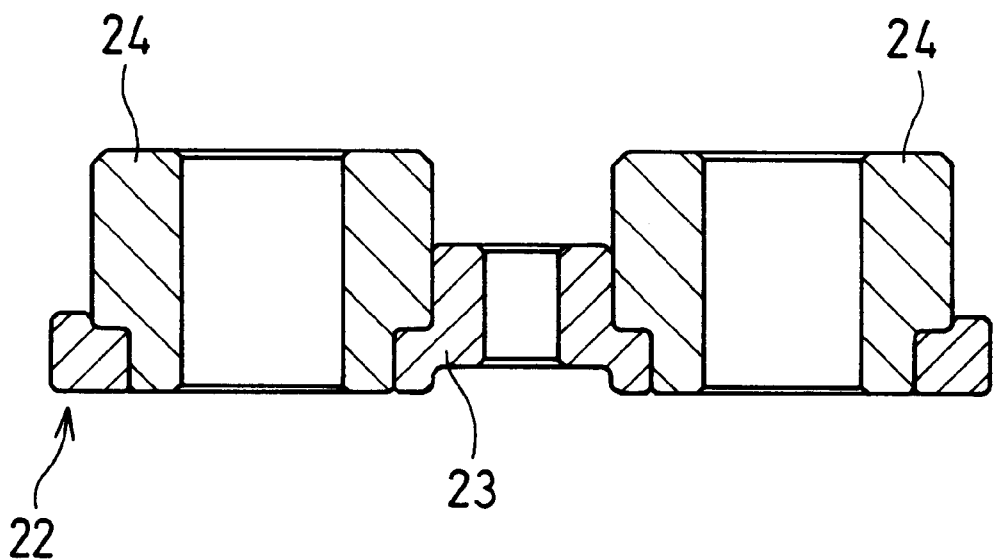
FIGS. 6 and 7 are illustrative views showing a coupling member.
Figure 7:
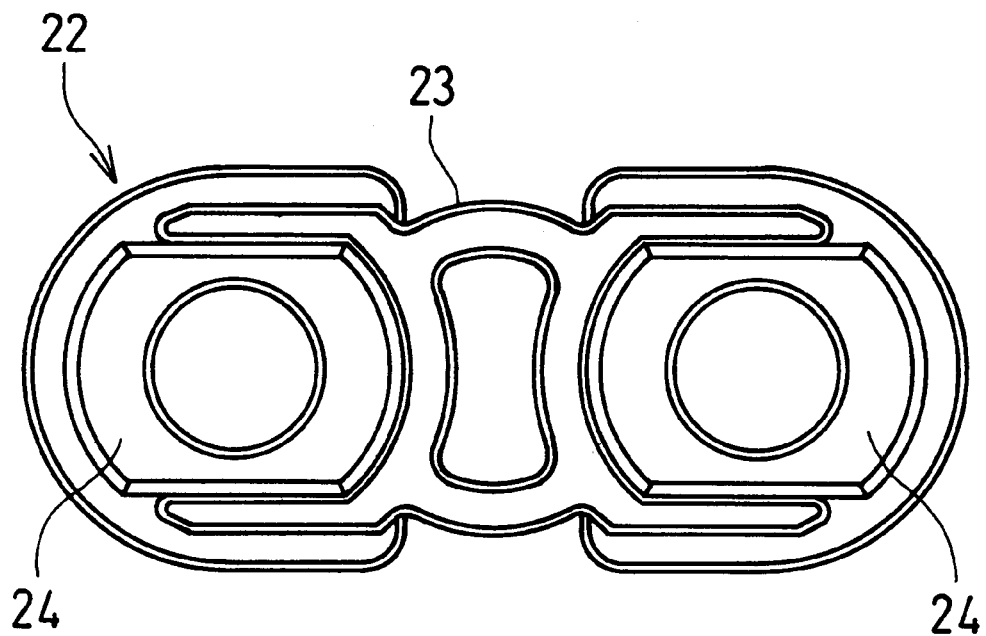

Also, in the hydraulic power steering apparatus 10, a coupling member 22 for coupling left and right tie-rods 21A, 21B to an intermediate portion of the rack shaft 12 is capable of reciprocating within a window-shaped portion 13A formed at a side wall of the power cylinder 13. In this case, the coupling member 22 is an assembly of a guide shoe 23 inserted slidably in the window-shaped portion 13A, and collars 24, 24 fitted into two portions of the guide shoe 23 spaced along a longitudinal direction thereof (refer to FIGS. 6, 7). The left and right tie-rods 21A, 21B are fastened to a mounting member 25. Left and right bolts 26, 26 penetrate the mounting member 25, a boot holder 27 disposed at a peripheral portion including the window-shaped portion 13A of the power cylinder 13, and the collars 24, 24 of the coupling member 22. The mounting member 25, the boot holder 27 and the coupling member 22 are fastened to mounting seats 12A, 12A respectively provided at two positions spaced along the longitudinal direction of the rack shaft 12.

Figure 8:
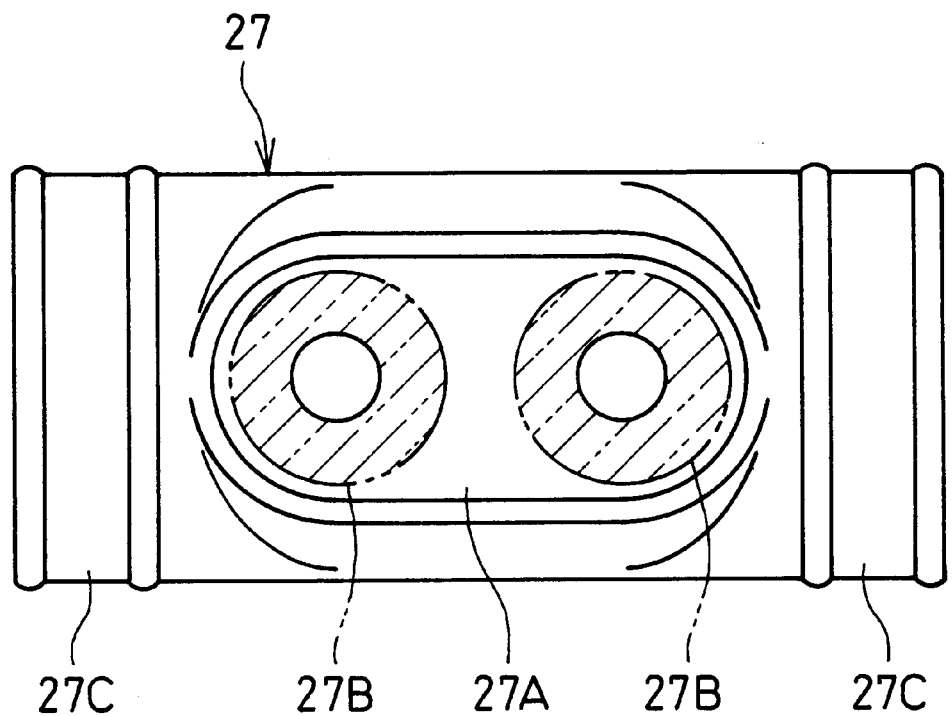
FIGS. 8 and 9 are illustrative views showing a boot holder.
Figure 9:
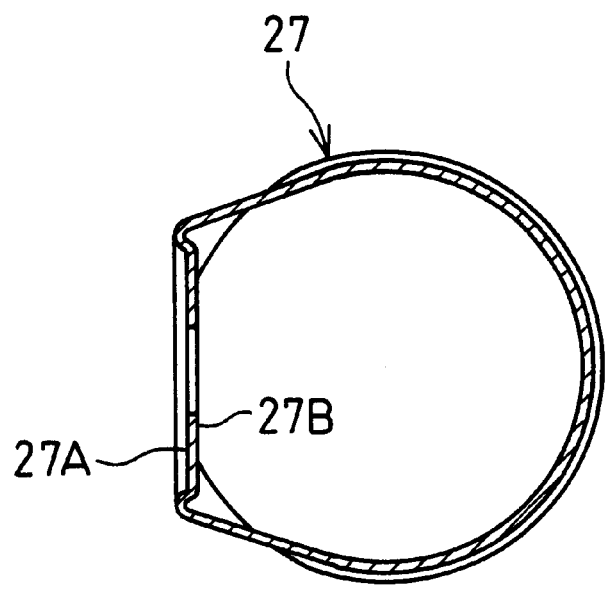

As shown in FIGS. 8 and 9, the boot holder 27 is formed in a generally cylindrical shape, and is provided at a portion thereof along its peripheral direction with a flat surface portion whose outer face serves as a mounting face 27A for the mounting member 25 and whose inner face serves as mounting faces 27B for the coupling member 22. Also, the boot holder 27 is provided with second mounting portions 27C, 27C for left and right boot 50, 50.

Also, in the hydraulic power steering apparatus 10, a valve housing 31 of a control valve 30 is fixed to a flange 11A of the gear housing 11 by bolts 31A. In the control valve 30, a steering shaft 32 rotated according to rotation of a steering wheel (not shown) is supported to the valve housing 31. A rotor (not shown) provided at the steering shaft 32 and a sleeve (not shown) fixed to a distal end portion of a torsion bar 32A, fixed to the steering shaft 32 together with a pinion (not shown) are coaxially disposed so as to be mutually displaced relative to each other through a resilient torsional deformation of the torsion bar 32A according to the steering torque added to the steering wheel. A pump side supplying flow path 33 and a tank side return flow path 34 are controllable so as to be switched between a first chamber 16A and a second chamber 16B of the power cylinder 13. The pinion meshes with rack teeth 35 of the rack shaft 12. The power steering apparatus 10 generates an assisting steering force of the steering wheel steered by a driver by feeding hydraulic oil from a pump to the power cylinder 13 to impart propelling force of the power cylinder 13 onto the rack shaft 12, as described above.

The power steering apparatus 10 is further provided with (A) a connecting structure of the power cylinder 13 to the gear housing 11 and (B) a sealing structure of the window-shaped portion 13A of the power cylinder 13, in the following manner.

Figure 2:
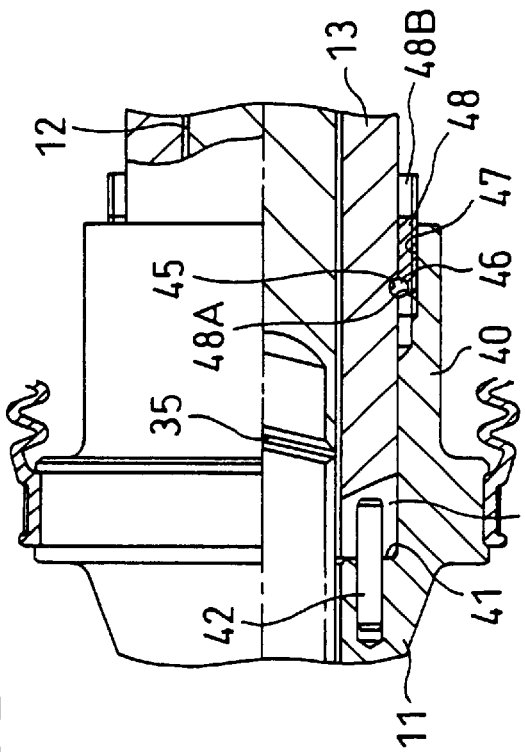
FIGS. 2 and 3 are enlarged views of a main portion of the hydraulic power steering apparatus shown in FIG. 1.
Figure 3:
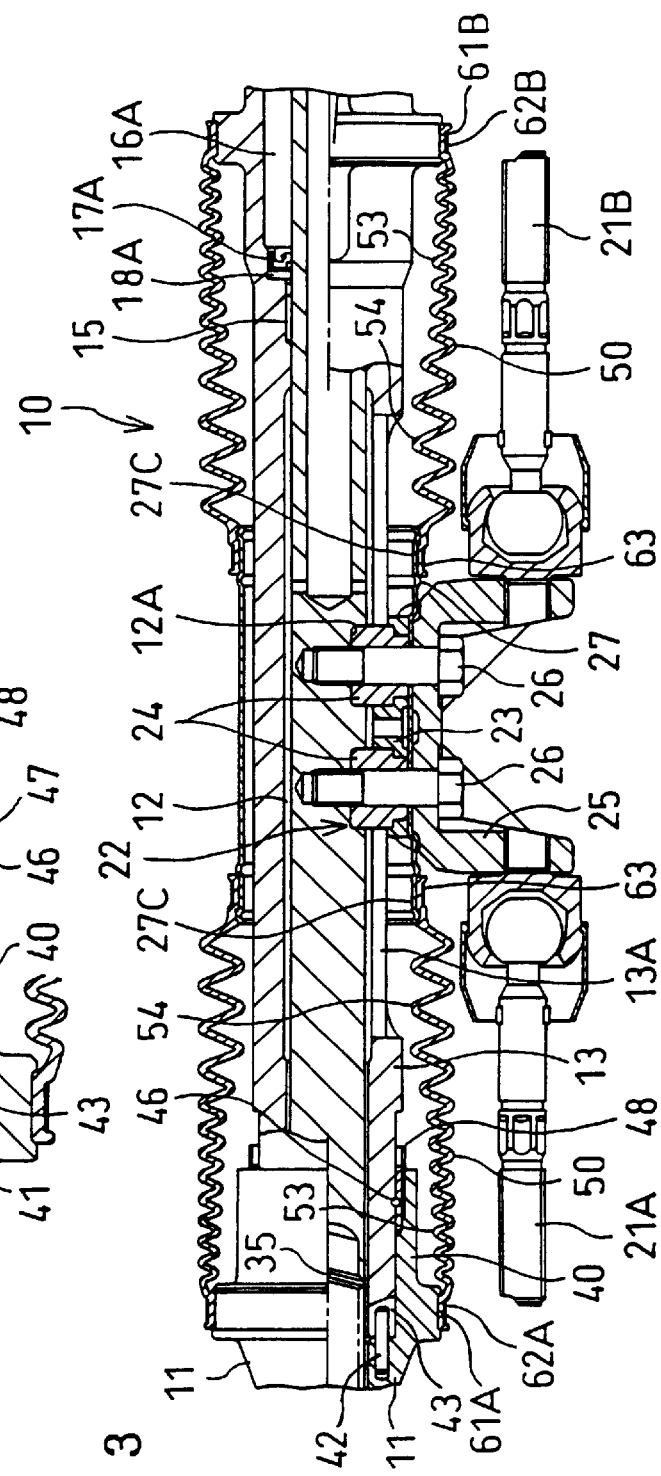

(A) The Connecting Structure of the Power Cylinder 13 to the Gear Housing 11 (refer to FIGS. 2 to 5):

A boss 40 in which a distal end portion of the power cylinder 13 is insertable is provided at an end portion of the gear housing 11, and a pin 42 is forcibly fitted into a specific position on an end face 41 deep in the boss 40, which is defined along the peripheral direction thereof (refer to FIGS. 2 and 3). An engaging groove 43 with which the pin 42 is engageable is formed at a specific position on an end face of a distal end portion of the power cylinder 13, which is defined along the peripheral direction thereof (refer to FIGS. 2 and 3). The engaging groove 43 is formed in a slit shape such that it extends in a direction of thickness (diameter) of the power cylinder 13 between the inner diameter (surface) and the outer diameter (surface) and, in this case, an engaging hole may be formed instead of the engaging groove 43. Thereby, the gear housing 11 and the power cylinder 13 are positioned regarding a rotation direction about a common center thereof by causing the engaging groove 43 of the power cylinder 13 to engage the pin 42 fixed to the gear housing 11, so that the guide shoe 23 of the connecting member 22 for the tie-rods 21A, 21B fixed to the rack shaft 12 supported by the gear housing 11 is caused to match with the window-shaped portion 13A of the power cylinder 13 regarding the position relative to each other about the rotation direction.

Figure 4:
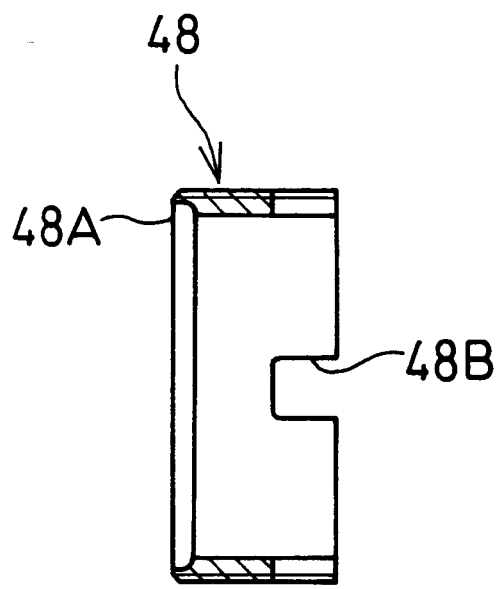
FIGS. 4 and 5 are illustrative views showing a lock nut.
Figure 5:
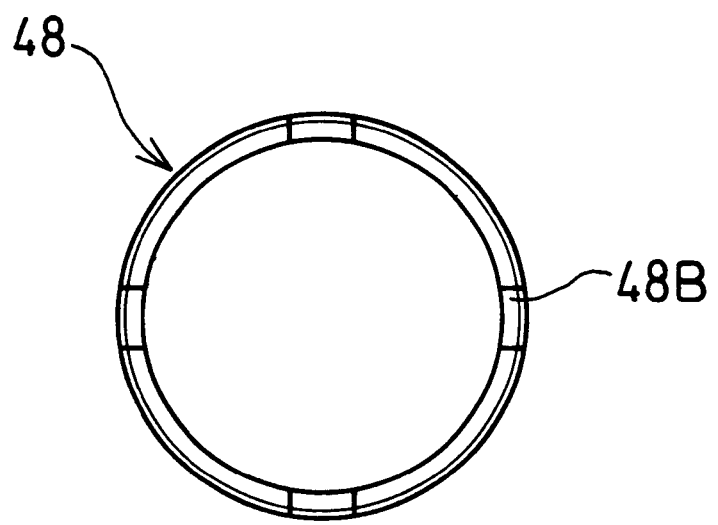

Also, a C-shaped stopper ring 46 is retained at a ring-shaped groove 45 formed at an outer peripheral portion of the distal end portion of the power cylinder 13 which is inserted into the boss 40 of the gear housing 11. A lock nut 48 is screwed into a threaded portion 47 provided at an opening portion of the boss 40 of the gear housing 11. A distal end face 48A of the lock nut 48 abuts the stopper ring 46 along an axial direction of the lock nut 48 so that the gear housing 11 and the power cylinder 13 can be fixed along an axial direction. As shown in FIGS. 4 and 5, the lock nut 48 has the distal end face 48A formed in an arc shape so as to be fitted with an outer peripheral portion of the stopper ring 46, and is formed at its proxinal end portion with an operation recess portion 48B for engagement of a rotating operation tool.

(B) The Sealing Structure of the Window-shaped Portion 13A of the Power Cylinder 13 (refer to FIGS. 2, 3, 8, 9 and 10)

As shown in FIG. 3, the window-shaped portion 13A of the power cylinder 13 is covered with the boot holder 27 fixed to the coupling member 22 for connection of the left and right tie-rods 21A, 21B mentioned above, and left and right boots 50, 50 made of resin, rubber or the like, to be sealed in a water tight manner. As mentioned above, the boot holder 27 is fixed to the coupling member 22 to be disposed about the power cylinder 13. Large diameter end mounting portion 51 positioned at one end of the left boot 50 is fastened on a first mounting portion 61A provided at an outer peripheral portion of the boss 40 of the gear housing 11 by a fastening band 62A, while a small diameter mounting portion 52 positioned at the other end thereof is fastened on a second mounting portion 27C of the left side of the boot holder 27 by a fattening band 63. As a result, the left boot 50 is caused to extend so as to surround a portion of the power cylinder 13. Also, a large diameter end mounting portion 51 positioned at one end of the right boot 50 is fastened on a first mounting portion 61B provided at an outer peripheral portion of the power cylinder 13 by a fastening band 62B, while a small diameter mounting portion 52 positioned at the other end thereof is fastened on a second mounting portion 27C of the right side of the boot holder 27 by another fastening band 63. As a result, the right boot 50 is caused to extend so as to surround another portion of the power cylinder 13. Thereby, the windowshaped portion 13A is sealed in a water tight manner to the outside by three members of the boot holder 27, and the left and right boots 50, 50.

Figure 10:
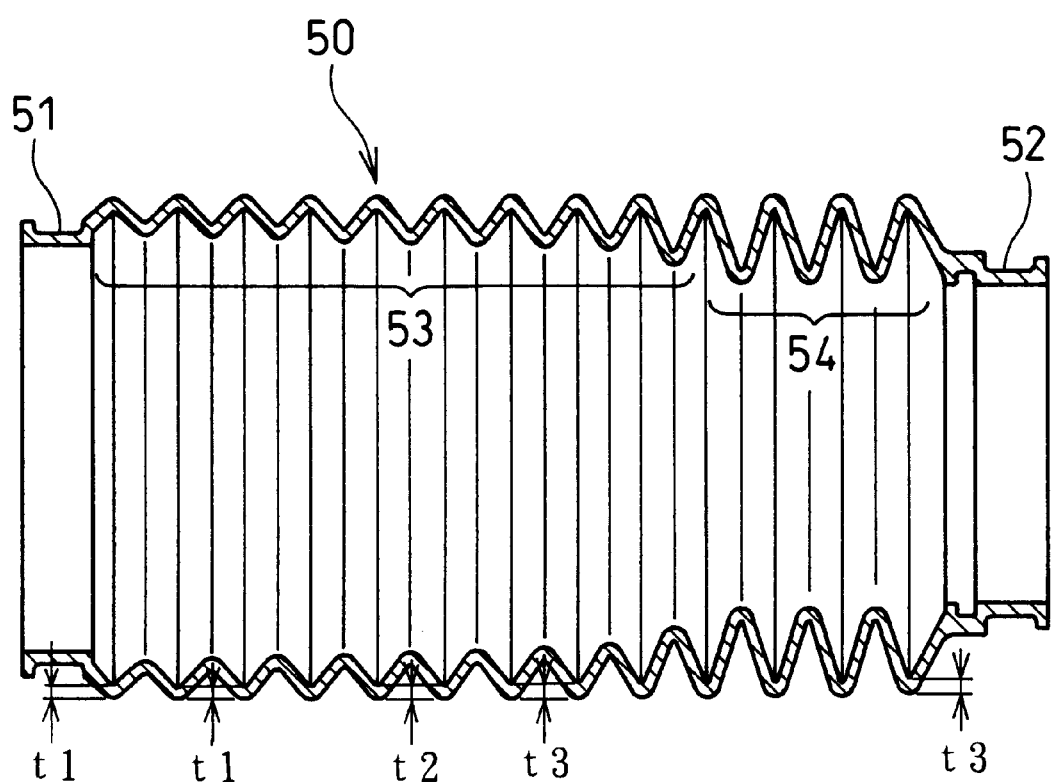
FIG. 10 is an illustrative view showing a boot.

In this case, as shown in FIG. 10, the left and right boots 50 are each formed in a bellows shape. Each boot 50 has an outer shape (1) extending straight from the large diameter mounting portion 51 fastened on the first mounting portion 61A of the gear housing 11, or the first mounting portion 61B of the power cylinder 13 towards the small diameter mounting portion 52 fastened on the second mounting portion 27C of the boot holder 27, as well as an inner shape (2) comprising a tapered portion 53 with a diameter reduced gradually from the large diameter mounting portion 51 and a straight portion 54 with almost the same diameter as the minimum inner diameter of the tapered portion 53 extending straight towards the small diameter mounting portion 52.

The boot 50, the thickness t thereof is changed from the Large diameter mounting portion 51 towards the small diameter portion 52 as $t_1 < t_2 < t_3$ (refer to FIG. 10).

In the power steering apparatus 10, a boot mounting member 71 is screwed in an end portion of the rack shaft 12 penetrating the power cylinder 13. One end portion of a boot 72 is fastened to a mounting portion 73 provided at an outer peripheral portion of one end portion of the power cylinder 13 by a fastening band 74, while the other end portion thereof is fastened to a mounting portion 71A of the boot mounting member 71 by a fastening ring 75. The rack shaft 12 is provided with communication paths 76, 76A and causing a sealed space defined in the boot 72 to communicate with a sealed space defined by the above-mentioned boot holder 27, and the left and right boots 50, 50.

Accordingly, operation of the power steering apparatus 10 according to the embodiment will be as follows:

(1) Positioning between the gear housing 11 and the power cylinder 13 relative to each other regarding a rotation direction of the power cylinder 13 can securely and easily be made by the pin 42 provided so as to connect the both. Thereby, when the lock nut 48 is screwed to the gear housing 11 (or the power cylinder 13), it is unnecessary to fix the power cylinder 13 (or the gear housing 11) so as not to rotate. Also, positioning between the coupling member 22, which connects the tie-rods 21A, 21B and the rack shaft 12, and the window-shaped portion 13A of the power cylinder 13 regarding the rotation direction of the power cylinder 13 can be secured, so that the connecting member 22 can be moved smoothly within the window-shaped portion 13A

(2) The window-shaped portion 13A of the power cylinder 13 is covered with the boot holder 27, which is made of metal or the like and is fixed to the coupling member 22 for connection of the tie-rods 21A, 21B, and the left and fight boots 50, 50. Accordingly, even when the coupling member 22 is moved repeatedly according to leftward and rightward movements of the rack shaft 12, since the mounting member 25 of the tie-rods 21A, 21B side is fixed to the coupling member 22, hales provided at the boot holder 27 for insertion of the bolts 26 or the like are not expanded, and the sealing property of each of the boots 50 is not damaged Thus, the durability of the boot 50 is improved.

The boot holder 27, made of metal or the like, is arranged so as to be interposed between the left boot 50 and the right boot 50, to support the left and right boots 50, 50 in a stable manner. As the respective boots 50 are shortened to be improved in rigidity, interference between the boots 50 and the tie-rods 21A, 21B or contact between the boots 50 and the rack shaft 12 can be prevented.

(3) Where the outer shape or contour of each boot 50 is straight, the outer surface of each boot 50 can be prevented from interfering with a corresponding one of the tie-rods 21A, 21B. As the inner shape of each boot 50 is structured so as to have the tapered portion 53 and the straight portion 54 extending straight with the same diameter as the minimum inner diameter of the tapered portion 53, sufficient rigidity of the boot 50 to prevent an intermediate portion of the boot 50 positioned between the mounting portions 51, 52 from hanging down can be achieved, and the inner surface of the boot 50 and the rack shaft 12 can also be prevented from contacting each other. The inner surface of tapered portion 53 of the boot 50 surrounds the gear housing 11, the power cylinder 13 or a connecting portion therebetween in a wide range, so that the degree of freedom for part or member layout can be enhanced within the range of the surroundings.

As set forth above, though the embodiment of the present invention has been explained in detail with reference to the drawings, the specific structure of the present invention is not limited to this embodiment. It should be understood by those skilled in the art that the present invention includes any modification and/or variation of the design within the spirit and scope of the invention. For example, the present invention is applicable not only to the hydraulic power steering apparatus but also to an electromotive power steering apparatus.

Also, the boot according to the present invention is applicable not only to the center take-off type power steering apparatus but also to various types of power steering apparatuses ordinarily used.

As set forth above, according to the present invention, in a center take-off type power steering apparatus, secure positioning between a gear housing and a power cylinder relative to each other can be achieved, and a coupling member between tie-rods and a rack shaft can readily be moved in a window-shaped portion of the power cylinder.

As mentioned above, according to the present invention, durability of a boot can be improved in a center take-off type power steering apparatus.

Also, according to the present invention, interference between a boot and a tie-rod or contact between the boot and a rack shaft can be prevented Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claim is:

1. A center take-off type power steering apparatus, comprising a rack shaft supported by a gear housing so as to be linearly movable, a power cylinder coupled to the gear housing, the rack shaft being arranged and constructed to penetrate the power cylinder, so that propelling forces generated by the power cylinder can be imparted in the rack shaft to assist steering force, a coupling member for coupling left and right tie-rods to an intermediate portion of the rack shaft, the coupling member being arranged and constructed to be movable in a reciprocating manner within a window-shaped portion formed at a side wall of the power cylinder, a boss in which a distal end portion of the power cylinder is insertable, being provided at the gear housing, a pin at a specific position on an end face along a peripheral direction of the end face deep in the boss at the gear housing and an end face of the distal end portion of the power cylinder having an engaging groove located at a specific position on the end face of the distal end portion of the power cylinder along a peripheral direction, so that the gear housing and the power cylinder being positioned with respect to a rotation direction about a common center axis of the both, the coupling member for the tie-rods for the tie-rods fixed to the rack shaft supported by the gear housing, being caused to match with the window-shaped portion of the power cylinder regarding the position relative to each other about the rotation direction, the gear housing and the power cylinder having a common center axis and being fixed regarding the axial direction of the power cylinder by abutment of a stopper ring provided at the distal end portion of the power cylinder with the lock nut screwed to an opening portion of a boss of the gear housing.

2. A center take-off type power steering apparatus, comprising: a rack shaft supported by a gear housing so as to be linearly movable a power cylinder coupled to the gear housing, the rack shaft being arranged and constructed to penetrate the power cylinder so that propelling forced generated by the power cylinder can be imparted on the rack shaft to assist steering force, a coupling member for coupling left and right tie-rods to an intermediate portion of the rack shaft, the coupling member being arranged and constructed to be movable in a reciprocating manner within a window-shaped portion formed at a side wall of the power cylinder, a metallic boot holder fixed to the coupling member for the left and right tie-rods being disposed so as to cover and surround the power cylinder, a left and a right boot for covering the window-shaped portion of the power cylinder at left and right sides of the metallic boot holder respectively extending between a corresponding one of first mounting portions of the gear housing and the power cylinder, and a corresponding one of second mounting portions of the metallic boot holder, both the metallic boot holder and the coupling member being fixed to the rack shaft.

3. A center take-off type power steering apparatus, comprising: a rack shaft supported by a gear housing so as to be linearly movable, propelling forced generated by a steering-assisting-force generator can be imparted on the rack shaft to assist steering force, a coupling member for coupling left and right tie-rods to an intermediate portion of the rack shafts, the coupling member being arranged and constructed to be movable in a reciprocating manner within a window-shaped portion formed at a side wall of the gear housing, a metallic boot holder fixed to the coupling member for the left and right tie-rods being disposed so as to cover and surround the gear housing, a left and right boot for covering the window-shaped portion of the gear housing at left and right sides of the metallic boot holder respectively extending between a corresponding one of first mounting portions of the gear housing, and a corresponding one of second mounting portions of the metallic boot holder, both of the metallic boot holder and the coupling member being fixed to the rack shaft.

* * * * *